(12) United States Patent
Minegishi et al.

(10) Patent No.: US 10,703,245 B2
(45) Date of Patent: Jul. 7, 2020

(54) VEHICLE SEAT WITH DETACHABLE LIFE LEVER

(71) Applicants: Tachi-S Co., Ltd., Tokyo (JP); Honda Motor Co., Ltd., Tokyo (JP)

(72) Inventors: Motoshi Minegishi, Tokyo (JP); Hirofumi Fuwa, Saitama (JP)

(73) Assignees: Tachi-S Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 5 days.

(21) Appl. No.: 16/136,327

(22) Filed: Sep. 20, 2018

(65) Prior Publication Data
US 2019/0092200 A1    Mar. 28, 2019

(30) Foreign Application Priority Data
Sep. 25, 2017 (JP) .................. 2017-184017

(51) Int. Cl.
*B60N 2/90* (2018.01)
*B60N 2/20* (2006.01)
*B60N 2/16* (2006.01)

(52) U.S. Cl.
CPC ........... *B60N 2/933* (2018.02); *B60N 2/1615* (2013.01); *B60N 2/20* (2013.01)

(58) Field of Classification Search
CPC ........ B60N 2/933; B60N 2/1615; B60N 2/20; B60N 2/165; B60N 2/22; B60N 2/682

USPC ....................................... 297/463.1
See application file for complete search history.

(56) References Cited

U.S. PATENT DOCUMENTS

| 7,472,963 | B2* | 1/2009 | Jeong | B60N 2/0296 |
| | | | | 297/463.1 |
| 7,959,229 | B2* | 6/2011 | Ishijima | B60N 2/0296 |
| | | | | 297/337 |
| 8,678,507 | B2* | 3/2014 | Yamazaki | B60N 2/6009 |
| | | | | 297/463.1 |
| 10,059,240 | B2* | 8/2018 | Mitsumoto | B60N 2/58 |
| 2015/0306983 | A1* | 10/2015 | Takei | B60N 2/6009 |
| | | | | 297/183.9 |

FOREIGN PATENT DOCUMENTS

| JP | 2009-166808 A | 7/2009 |
| JP | 2010-057524 A | 3/2010 |

* cited by examiner

*Primary Examiner* — Milton Nelson, Jr.
(74) *Attorney, Agent, or Firm* — Morgan, Lewis & Bockius LLP (57) ABSTRACT

Provided is a vehicle seat that enables a lift lever to be detached without detaching a reclining lever from the vehicle seat. The vehicle seat is configured such that, when a reclining lever is turned downward, the reclining lever and a fastening member of a lift lever as viewed from the side of a seat part overlap each other, and when the reclining lever is turned upward, the reclining lever and the fastening member of the lift lever as viewed from the side of the seat part do not overlap each other, and the lift lever can be detached from the seat part.

6 Claims, 11 Drawing Sheets

VEHICLE SEAT WITH DETACHABLE LIFE LEVER

The present application is based on Japanese Patent Application No. 2017-184017 filed on Sep. 25, 2017, the contents of which are incorporated herein by reference.

BACKGROUND

Field

The present invention relates to a vehicle seat.

Description of Related Art

Some vehicle seats include, on a side surface of a seat part, a lift lever for lifting and lowering the seat part and a reclining lever for tilting a backrest part (refer to Patent Publication JP-A-2010-057524 and Patent Publication JP-A-2009-166808).

Meanwhile, as for the lift lever and the reclining lever mentioned above, the reclining lever is, in some cases, disposed at the outer side of the lift lever such that the lift lever and the reclining lever overlap each other when viewed from the side, in consideration of the vehicle layout around the seat and the style of the seat.

However, when it is desired to detach the lift lever alone, for example, to perform maintenance of the vehicle seat or to replace the lift lever, such a configuration requires first detaching the reclining lever on the outer side before detaching the lift lever on the inner side. This increases the number of work steps, and thus increases the time spent on the work.

With the foregoing in view, it is an object of the present invention to provide a vehicle seat that enables the lift lever to be detached without detaching the reclining lever from the vehicle seat.

SUMMARY

A vehicle seat according to one aspect of the present invention includes a lift lever and a reclining lever that are provided on a side surface of a seat part. The lift lever is freely turned upward and downward to lift and lower the seat part, and the reclining lever is freely turned upward and downward to operate a reclining mechanism which supports a backrest part in a manner such that the backrest part can be tilted with respect to the seat part. The reclining lever is disposed on the outer side of the lift lever. The seat part includes a rotation part that is rotated by turning of the lift lever to lift and lower the seat part. The lift lever includes a turning base that is fastened onto the rotation part of the seat part by a fastening member. When the reclining lever is turned downward, the reclining lever and the fastening member as viewed from a side of the seat part overlap each other, and when the reclining lever is turned upward, the reclining lever and the fastening member as viewed from the side of the seat part do not overlap each other, and the lift lever can be detached from the seat part.

In accordance with this aspect, the lift lever is detached without detaching the reclining lever from the vehicle seat. Thus the maintenance of the lift lever is facilitated, and the time spent on the maintenance is reduced.

An outer surface of the lift lever may be provided with a notch where the reclining lever enters when the lift lever is detached. In such a case, the lift lever and the reclining lever are prevented from interfering with each other in detaching the lift lever.

The notch may be provided at a position that is in the outer surface of the lift lever and corresponds to the reclining lever as turned upward. In such a case, the lift lever and reclining lever are suitably prevented from interfering with each other in detaching the lift lever.

A held part which is fitted into and held by the rotation part of the seat part may be formed on an inner surface of the turning base of the lift lever. In such a case, the lift lever is held by and temporarily fixed to the rotation part of the seat part when the lift lever is attached. This allows a worker to use both hands to fasten the lift lever onto the rotation part of the seat part. As a result, the workability of attachment of the lift lever is improved even in the condition where the reclining lever is present there.

The rotation part may include a circular body having an uneven outer periphery, and the held part may include a plurality of fit-in parts that are inserted into recesses of the outer periphery of the circular body. In such a case, the lift lever is firmly, reliably held by the rotation part of the seat part.

The fit-in parts may be disposed in plurality on each of both sides of a center line passing through the center of the circular body and extending in a radial direction of the circular body. The distance between the fit-in parts on one side of the center line and the distance between the fit-in parts on the other side of the center line may differ from each other. In such a case, the fit-in parts having the shorter distance therebetween fully regulate rotational movement of the rotation part of the seat part with respect to the lift lever, and the fit-in parts having the longer distance therebetween fully regulate radial movement of the rotation part of the seat part. Accordingly, the lift lever is firmly, reliably held by the rotation part of the seat part.

The reclining lever may include a frame part freely turnably connected to a rotation shaft of the reclining mechanism, and an operation part provided on the tip side of the frame part. The frame part may have a curved shape protruding downward, and is formed so as to have an up-to-down width that gradually decreases from the rotation shaft side toward the operation part side. In such a case, the strength of the frame part is ensured while the reclining lever as turned upward is less prone to overlap the fastening member.

In accordance with the present invention, the lift lever is detached without detaching the reclining lever from the vehicle seat.

DETAILED DESCRIPTION

Hereafter, a preferred embodiment of the present invention is described with reference to the drawings. Note that identical elements are assigned an identical reference sign, and repeated explanation is omitted. In addition, the positional relationship such as up, down, left, and right is in conformance to the positional relationship shown in the drawings, unless otherwise specified. Furthermore the dimensional ratio is not limited to the dimensional ratio shown in the drawings. In addition, the embodiment below merely serves as an example for explaining the present invention; the present invention is not limited to this embodiment.

Figure 1:
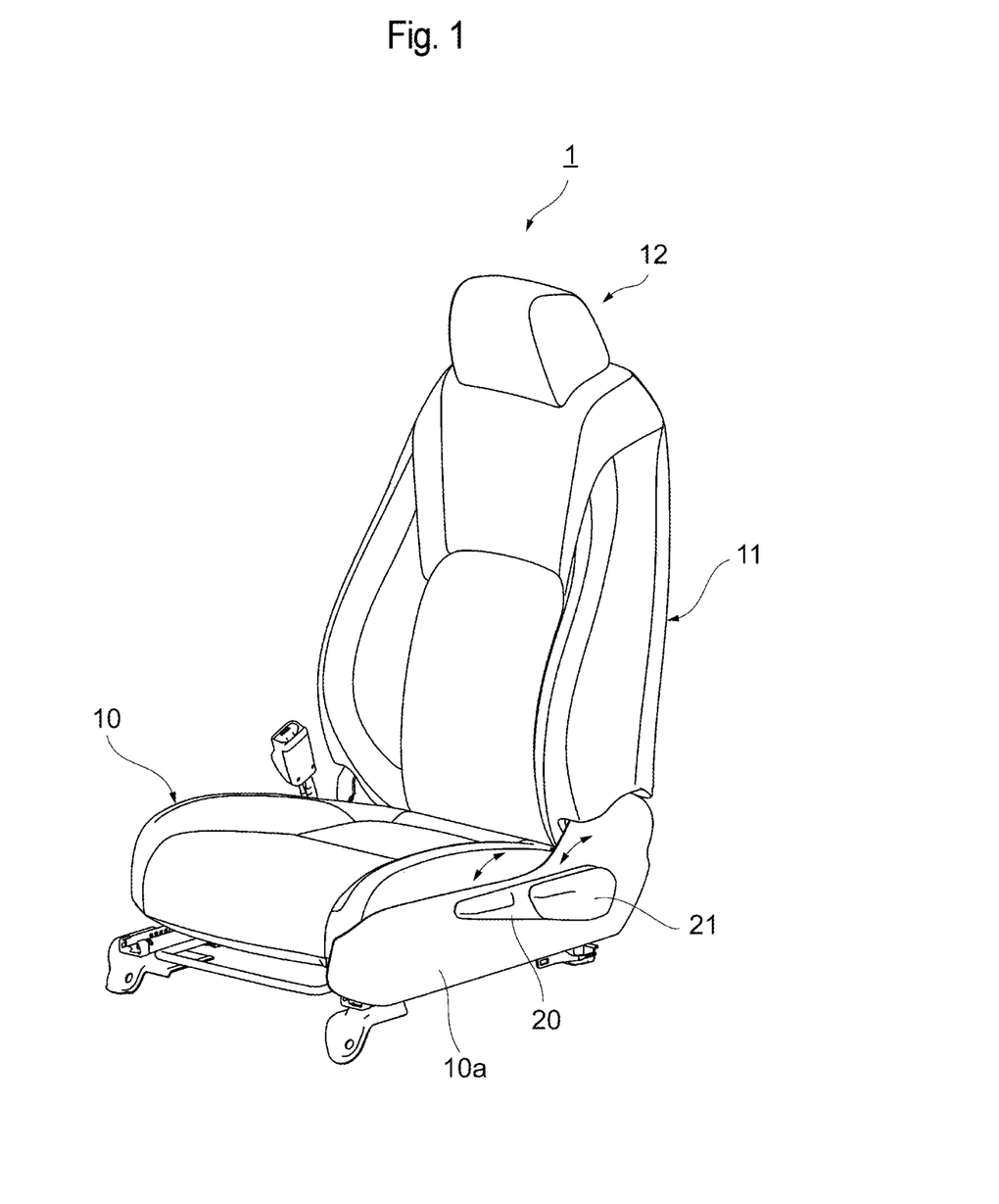
FIG. 1 is a perspective view showing one example of the configuration of a vehicle seat.

FIG. 1 shows one example of the configuration of a vehicle seat 1. For example, the vehicle seat 1 includes a seat part 10 that allows an occupant to sit thereon, a backrest part 11 that allows the occupant to rest the back thereagainst, and a headrest 12. The vehicle seat 1 has a reclining function of tilting the backrest part 11 back and forth with respect to the seat part 10, and a lift function of lifting and lowering the seat part 10.

The vehicle seat 1 includes, on one side surface 10a of the seat part 10, a lift lever 20 for lifting and lowering the seat part 10, and a reclining lever 21 for controlling tilt movement of the backrest part 11. The lift lever 20 is freely turned upward and downward, and thus the occupant can lift and lower the seat part 10 by turning the lift lever 20 upward and downward. The reclining lever 21 is freely turned upward and downward, and thus the occupant can tilt the backrest part 11 by turning the reclining lever 21 upward. The lift lever 20 is provided on the side surface 10a of the seat part 10, and the reclining lever 21 is provided on the outer side of the lift lever 20.

Figure 2:
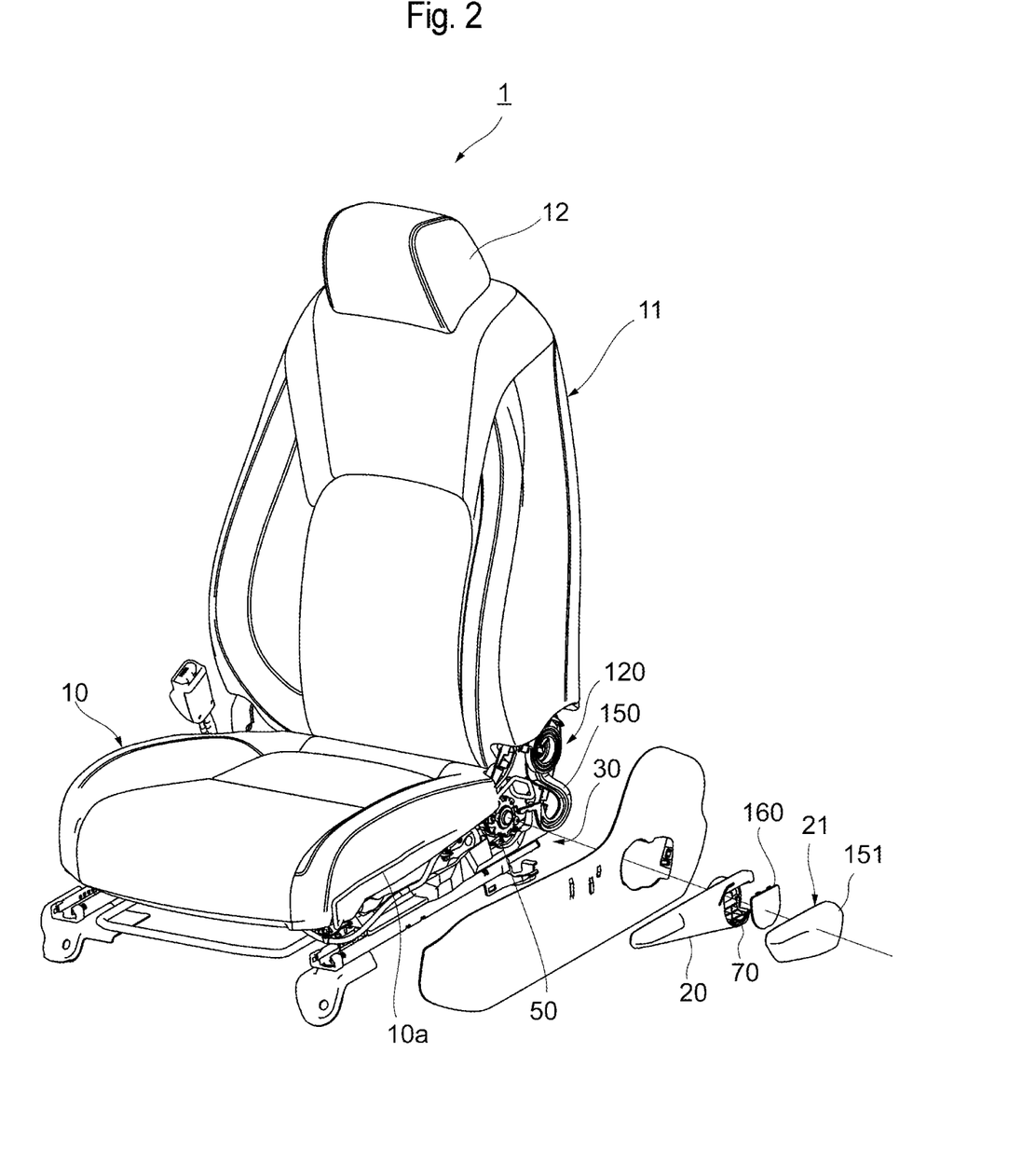
FIG. 2 is an exploded view showing the vehicle seat partly disassembled.

The lift lever 20 is connected to a lift mechanism 30 provided inside the seat part 10, as shown in FIG. 2. The lift mechanism 30 includes a ratchet 50 as a rotation part, a first gear 51, and a link mechanism 52. The ratchet 50 is provided on an outer surface of a side surface frame 40 of the seat part 10, as shown in, for example, FIG. 3. The first gear 51 and the link mechanism 52 are provided on an inner surface of the side surface frame 40, as shown in FIG. 4.

Figure 3:
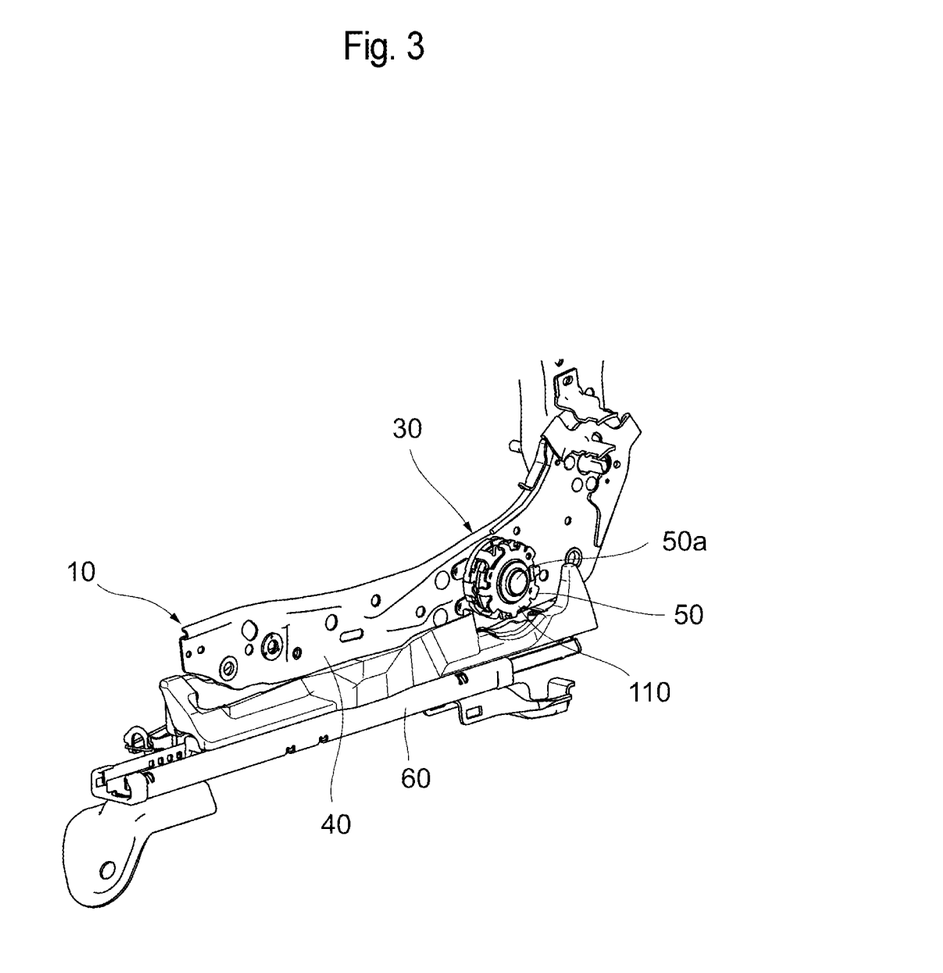
FIG. 3 illustrates the outer side of a side frame of a seat part.
Figure 4:
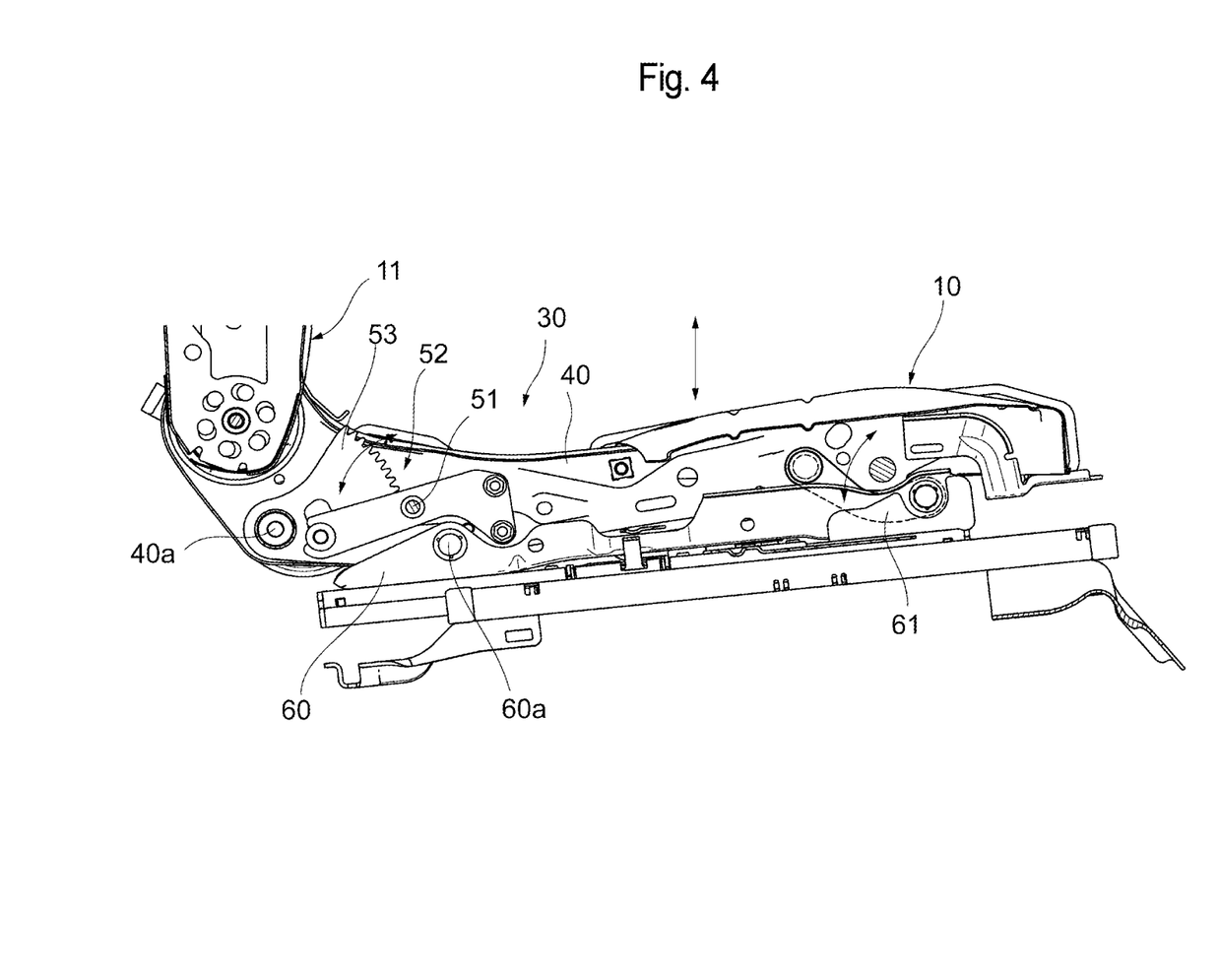
FIG. 4 illustrates the inner side of the side frame of the seat part.

The lift lever 20 is fixed onto the ratchet 50 shown in FIG. 3. The ratchet 50 is actuated in accordance with the upward and downward turn of the lift lever 20, and rotates by a predetermined angle with each operation of turning the lift lever 20 upward and downward. The first gear 51 shown in FIG. 4 is pivotally supported on a rotation shaft 50a of the ratchet 50 to rotate in accordance with the rotation of the ratchet 50. The link mechanism 52 is formed of, for example, a second gear 53 that meshes with the first gear 51, the side surface frame 40, a base frame 60 disposed below the seat part 10, and a first link frame 61.

The second gear 53 is pivotally supported on a rotation shaft 40a of the side surface frame 40 and a rotation shaft 60a of the base frame 60. The second gear 53 rotates about the rotation shaft 60a in accordance with the rotation of the first gear 51 to swing the side surface frame 40. At this moment, the first link frame 61 is also swung in harmony with the side surface frame 40. Thus, turning the lift lever 20 upward and downward in a reciprocating manner actuates and rotates the ratchet 50. As a result, the first gear 51 rotates to actuate the link mechanism 52 to lift and lower the side surface frame 40 (the seat part 10) with respect to the base frame 60. Note that the configuration of the lift mechanism 30 is not limited to this; any other publicly known configuration can be used to lift and lower the seat part 10.

Figure 5:
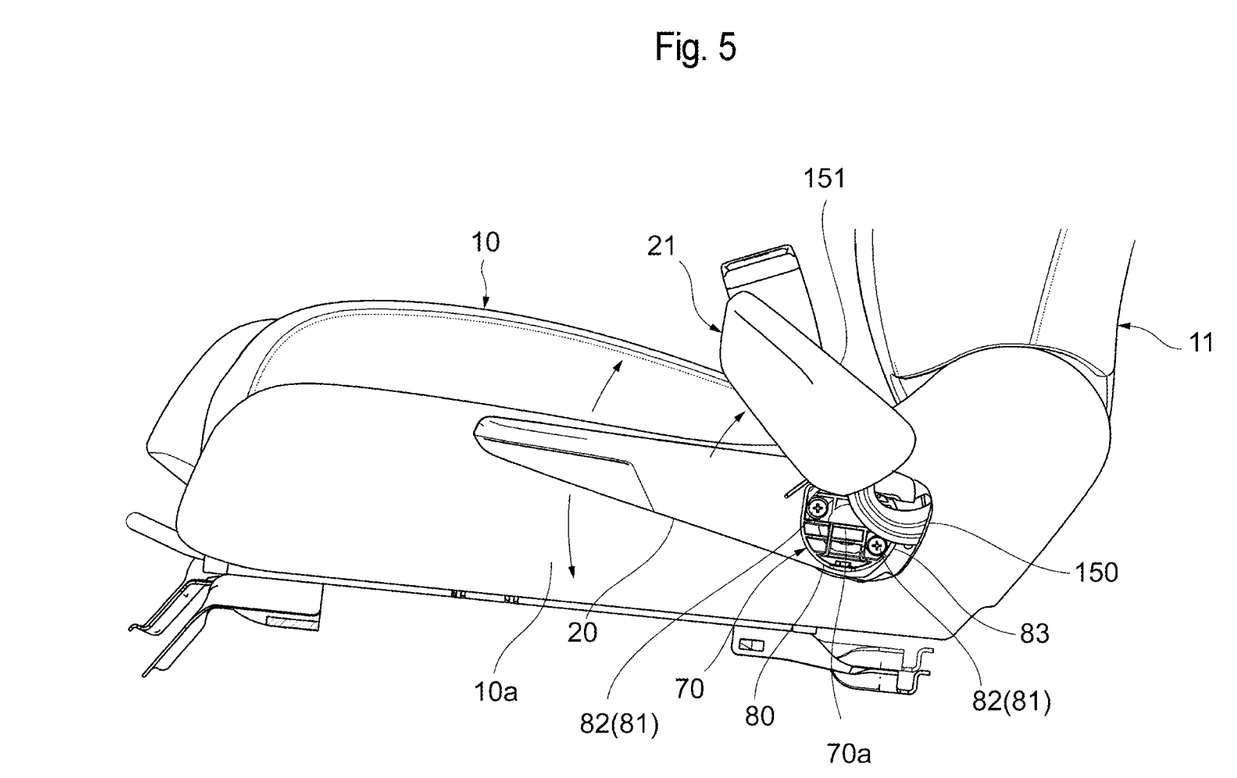
FIG. 5 illustrates the seat part, as viewed from the side, with a reclining lever in a tilted position.
Figure 6:
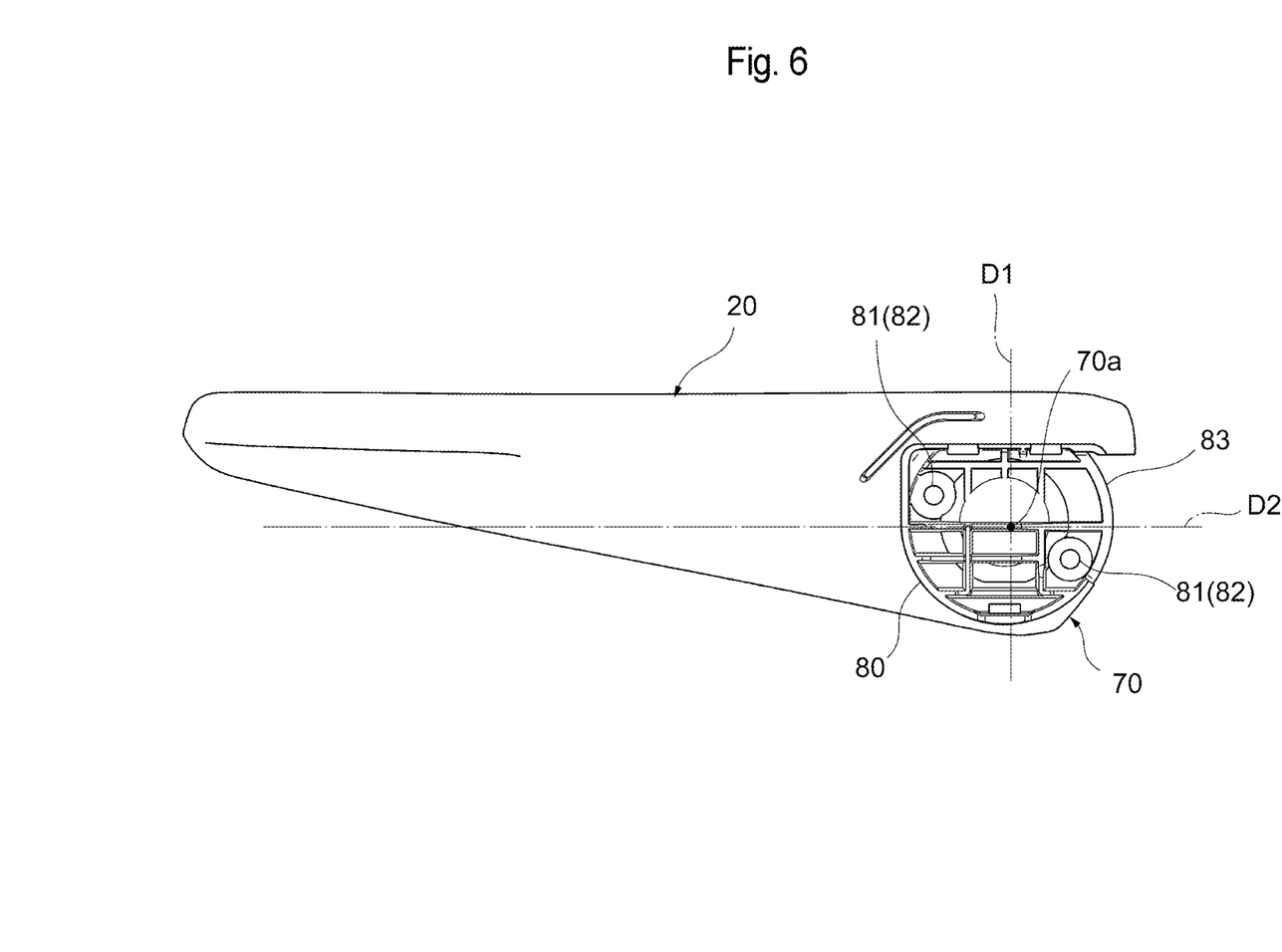
FIG. 6 is a plan view showing an outer surface of a lift lever.

The lift lever 20 is fixed onto the ratchet 50 provided on the side surface 10a of the seat part 10 shown in FIG. 3. As shown in FIG. 5 and FIG. 6, the lift lever 20 is made of, for example, a resin, and has a slim shape having a vertical width gradually tapering toward the seat front. The lift lever 20 includes a turning base (a basal part) 70 that is disposed in a rearward position of the seat and is fixed onto the ratchet 50. The turning base 70 is formed in, for example, a circular shape having a rotation shaft 70a as a center thereof. The front surface side (the outer surface side) of the turning base 70 is formed in a recessed shape and includes an outer peripheral wall 80 on an outer periphery thereof. On a bottom part inside the outer peripheral wall 80, a plurality of, for example, two fastening holes 81 are provided, and fastening members 82 such as screws are attached onto the fastening holes 81. The two pairs of fastening holes 81 and fastening members 82 are, for example, positioned point-symmetric about the rotation shaft 70a; one of the pairs is provided rearward relative to a vertical center line D1 of the turning base 70 and below a horizontal center line D2 of the turning base 70, and the other of the pairs is provided frontward relative to the vertical center line D1 and above the horizontal center line D2. As shown in FIG. 5, when viewed from the side, the fastening holes 81 and fastening members 82 are provided at positions that prevent them from overlapping the reclining lever 21 as turned upward to the limit.

Figure 7:
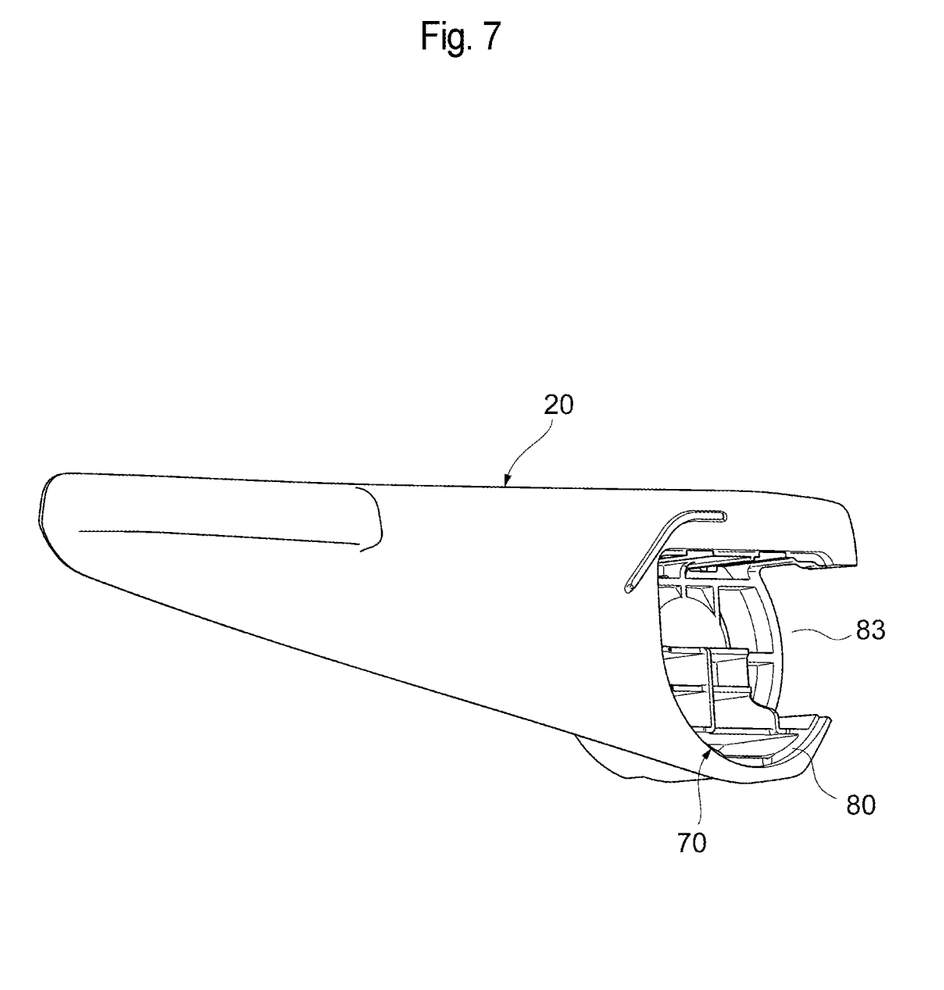
FIG. 7 is a perspective view of the lift lever.

As shown in FIG. 7, the outer peripheral wall 80, for example, of the turning base 70 is provided with a notch 83 where the reclining lever 21 enters when the lift lever 20 is detached. The notch 83 is provided on the seat rear side. The notch 83 is provided at a position that, when viewed from the side of the seat part 10, corresponds to a frame part 150, described later, of the reclining lever 21 as turned upward, as shown in FIG. 5.

Figure 8:
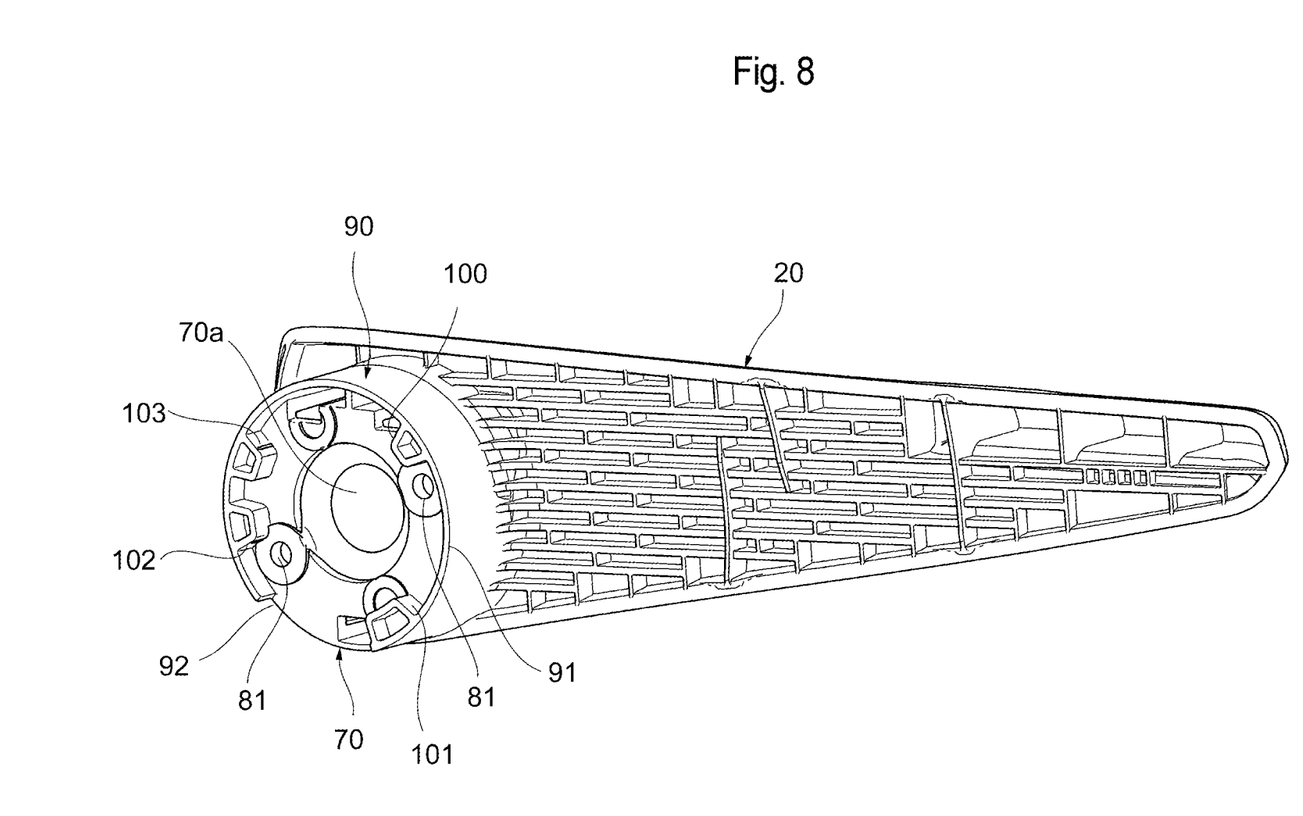
FIG. 8 is a perspective view of the lift lever as viewed from the inner surface side.
Figure 9:
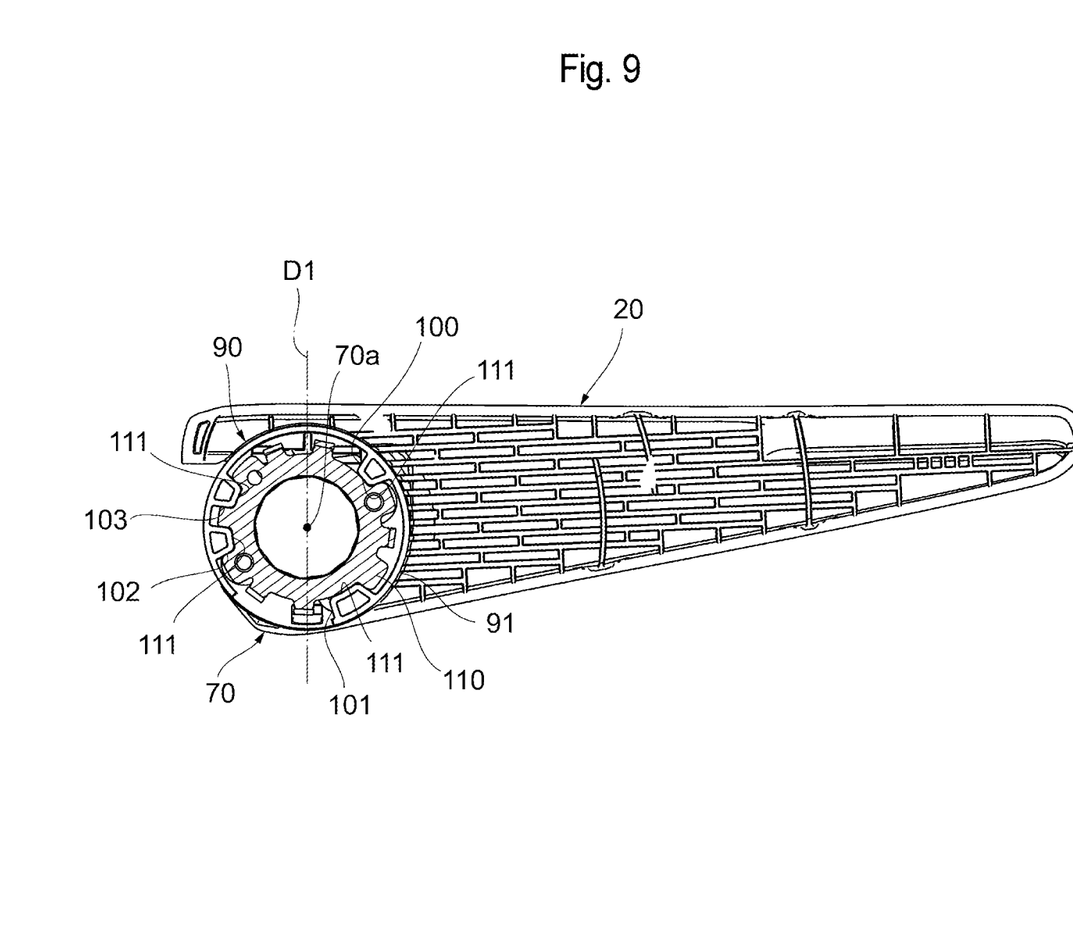
FIG. 9 illustrates a state in which a circular body of a ratchet and a held part of the lift lever are fitted into each other.

As shown in FIG. 8, the back surface side (the inner side) of the turning base 70 serves as a held part 90 that is fitted into and held by the ratchet 50. The held part 90 is formed in a recessed, circular shape with the rotation shaft 70a as a center thereof, and includes, on an outer periphery thereof, an outer peripheral wall 91 for covering the periphery of the ratchet 50. The outer peripheral wall 91 has a notch 92 at a lower part thereof. The inside of the outer peripheral wall 91 is provided with a plurality of, for example, four fit-in parts (ribs) 100, 101, 102, and 103 along an inner periphery of the outer peripheral wall 91. As shown in FIG. 9, the ratchet 50 has a circular body 110 having an uneven outer periphery, and the fit-in parts 100 to 103 are located in recesses 111 of the outer periphery of the circular body 110.

The fit-in parts 100 and 101 are provided frontward relative to a vertical center line D1 of the circular body 110, and the fit-in parts 102 and 103 are provided rearward relative to the center line D1 of the circular body 110.

The fit-in parts 100 and 101 are disposed approximately 70° to 110° apart from each other about the rotation shaft 70a. The fit-in parts 102 and 103 are disposed approximately 20° to 45° apart from each other about the rotation shaft 70a. Accordingly, the distance between the two rearward fit-in parts 102 and 103 is shorter than the distance between the two frontward fit-in parts 100 and 101.

Figure 10:
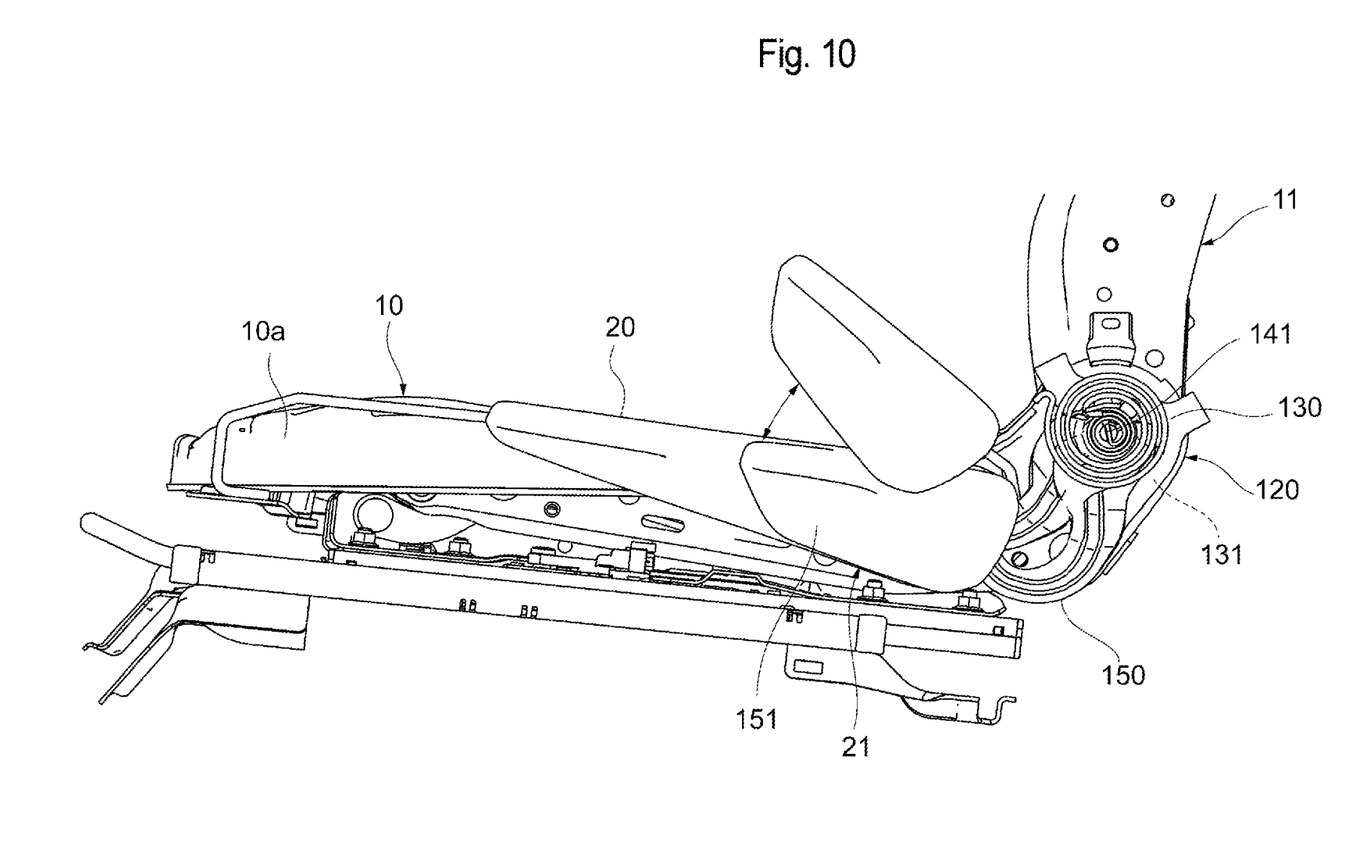
FIG. 10 illustrates a reclining mechanism.

As shown in FIG. 10, the reclining lever 21 is connected to a reclining mechanism 120 provided between the seat part 10 and the backrest part 11. The reclining mechanism 120 includes a spring 130 that urges the backrest part 11 toward the forward tilt side, and a lock mechanism 131 for securing a position of the backrest part 11 in the tilt direction. Turning the reclining lever 21 to a position tilted a predetermined angle upward from the horizontal position unlocks the backrest part 11 secured by the lock mechanism 131. As a result, the backrest part 11 is urged by the spring 130 and thus is tilted forward. Turning the reclining lever 21 downward to return it to the horizontal position secures the backrest part 11 by the lock mechanism 131. In this regard, the angle of the maximum tilted position of the reclining lever 21 relative to the horizontal direction, is, for example, approximately 32.5°. In addition, the configuration of the reclining mechanism 120 is not limited to this; any other publicly known configuration can be used to tilt the seat part 10.

Figure 11:
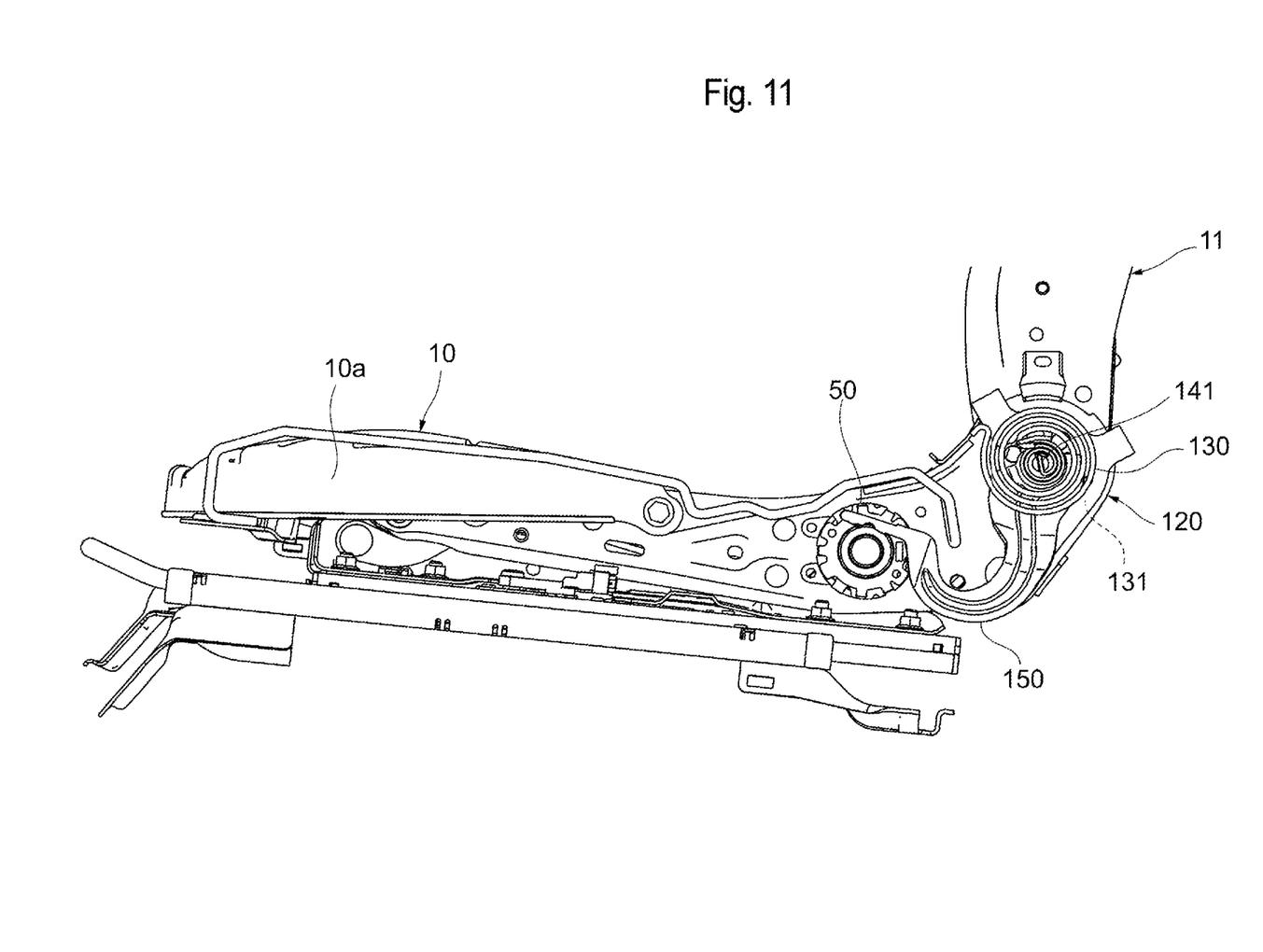
FIG. 11 illustrates a frame part of the reclining lever.

The reclining lever 21 has the frame part 150 freely turnably connected to a rotation shaft 141 of the reclining mechanism 120, and an operation part 151 provided on the tip side of the frame part 150. The frame part 150 is made of, for example, a metal, and as shown in FIG. 11, extends from the rotation shaft 141 toward the seat front side, and bends so as to protrude downward. The frame part 150 is formed so as to have an up-to-down width that gradually decreases from the rotation shaft 141 side toward the operation part 151 side. As shown in FIG. 10, the operation part 151 is made of, for example, a resin, and has a slim shape that extends forward. The operation part 151 is formed, for example, larger than the turning base 70 of the lift lever 20 to cover the turning base 70.

When the reclining lever 21 has been put in the horizontal position, the reclining lever 21 and the fastening members 82 of the lift lever 20 as viewed from the side of the seat part 10 overlap each other. As shown in FIG. 5, when the reclining lever 21 is turned upward to a tilted position, for example, to a maximum tilted position, the reclining lever 21 and the fastening members 82 as viewed from the side of the seat part 10 do not overlap each other. In the present embodiment, although a cover 160 (shown in FIG. 2) is attached to the turning base 70 of the lift lever 20, whether the reclining lever 21 and the fastening members 82 as viewed from the side of the seat part 10 overlap each other is determined in the condition where the cover 160 is removed.

In detaching the lift lever 20 in the vehicle seat 1 having the configuration mentioned above, the reclining lever 21 is turned from the horizontal position to the tilted position, as shown in FIG. 5. Then, the cover 160 (shown in FIG. 2) is removed to expose the two fastening members 82 of the turning base 70 of the lift lever 20. After the fastening members 82 are removed, the entire lift lever 20 is pulled toward the side of the seat part 10 (toward the worker side). As a result, the held part 90 on the inner surface side of the turning base 70 is removed from the ratchet 50. Here, the notch 83 on the outer surface side of the turning base 70 prevents the turning base 70 and the reclining lever 21 from interfering with each other, and the lift lever 20 can be detached through the lower side of the reclining lever 21.

In attaching the lift lever 20, the held part 90 of the turning base 70 of the lift lever 20 is fitted into the ratchet 50 with the reclining lever 21 in the tilted position. Here, the fit-in parts 100 to 103 of the held part 90 and the outer peripheral wall 91 are fitted into the ratchet 50, and thus the lift lever 20 is held by the ratchet 50. Thus, the lift lever 20 is in a state of being prevented from dropping even when released from a hand. Next, the fastening members 82 are inserted into the fastening holes 81 to fasten the lift lever 20 onto the ratchet 50. Next, the cover 160 is attached, and then the reclining lever 21 is returned to the horizontal position.

According to the embodiment, the vehicle seat 1 is configured such that, when the reclining lever 21 is turned to the horizontal position, the reclining lever 21 and the fastening members 82 of the lift lever 20 as viewed from the side of the seat part 10 overlap each other, and when the reclining lever 21 is turned upward to the tilted position, the reclining lever 21 and the fastening members 82 as viewed from the side of the seat part 10 do not overlap each other, and the lift lever 20 can be detached from the seat part 10 in that condition. This configuration enables the lift lever 20 to be detached without detaching the reclining lever 21 from the vehicle seat 1, facilitates the maintenance of the lift lever 20, and reduces the time spent on the maintenance.

The outer surface of the lift lever 20 is provided with the notch 83 where the reclining lever 21 enters when the lift lever 20 is detached. This prevents the lift lever 20 and reclining lever 21 from interfering with each other in detaching the lift lever 20.

The notch 83 is formed at a position that is in the outer surface of the lift lever 20 and corresponds to the reclining lever 21 as turned upward. This suitably prevents the lift lever 20 and reclining lever 21 from interfering with each other in detaching the lift lever 20.

The inner surface of the turning base 70 of the lift lever 20 is provide with the held part 90 that is fitted into and held by the ratchet 50 of the seat part 10. Thus, the lift lever 20 is held by and temporarily fixed to the ratchet 50 when the lift lever 20 is attached. This allows a worker to use both hands to fasten the lift lever 20 onto the ratchet 50 of the seat part 10, thus improving the workability of attachment of the lift lever 20 even in the condition where the reclining lever 21 is present there.

The held part 90 has the plurality of fit-in parts 100 to 103 that are inserted into the recesses 111 on the outer periphery of the circular body 110 of the ratchet 50, and the lift lever 20 is therefore firmly, reliably held by the ratchet 50.

The fit-in parts 100 to 103 are disposed in pairs on both sides of the center line D1 passing through the center of the circular body 110 and extending in the radial direction. The distance between the fit-in parts 100 and 101 on one side of the center line D1 differs from the distance between the fit-in parts 102 and 103 on the other side. This allows the fit-in parts 102 and 103 having the shorter distance therebetween to fully regulate rotational movement of the ratchet 50 of the seat part 10 with respect to the lift lever 20, and allows the fit-in parts 100 and 101 having the longer distance therebetween to fully regulate radial movement of the ratchet 50 of the seat part 10. As a result, the lift lever 20 is firmly, reliably held by the ratchet 50.

The frame part 150 of the reclining lever 21 has a curved shape protruding downward, and is formed so as to have an up-to-down width that gradually decreases from the rotation shaft 141 side toward the operation part 151 side. This ensures the strength of the frame part 150 while making the reclining lever 21 less prone to overlap the fastening members 82.

So far, the preferred embodiment of the present invention has been described with reference to the attached drawings. The present invention, however, is not limited to this embodiment. Those skilled in the art could conceive of various changed or modified examples without departing from the spirit of the claims. It is construed, as a matter of course, that such changes or modifications are included in the technical scope of the present invention.

For example, the configurations of the lift lever 20, the lift mechanism 30, the reclining lever 21, and the reclining mechanism 120, etc. are not limited to those described in the embodiment. The configurations of the held part 90, the fastening holes 81, and the notch 83, etc. of the turning base 70 of the lift lever 20 are also not limited to those described in the embodiment. As well, the configurations of the seat part 10 and the backrest part 11 and the entire configuration of the vehicle seat 1 are not limited to those described in the embodiment.

The present invention is useful in providing a vehicle seat that enables the lift lever to be detached without detaching the reclining lever from the vehicle seat.

What is claimed is:

1. A vehicle seat comprising:
   a lift lever which is freely turned upward and downward to lift and lower a seat part; and
   a reclining lever which is freely turned upward and downward to operate a reclining mechanism which supports a backrest part in a manner such that the backrest part can be tilted with respect to the seat part,
   the lift lever and the reclining lever being provided on a side surface of the seat part,
   wherein the reclining lever is disposed on an outer side of the lift lever,
   the seat part includes a rotation part which is rotated by turning of the lift lever to lift and lower the seat part,
   the lift lever includes a turning base which is fastened onto the rotation part of the seat part by a fastening member,
   when the reclining lever is turned downward, the reclining lever and the fastening member as viewed from a side of the seat part overlap each other, and when the reclining lever is turned upward, the reclining lever and the fastening member as viewed from the side of the seat part do not overlap each other, and the lift lever can be detached from the seat part, and
   an outer surface of the lift lever is provided with a notch where the reclining lever enters when the lift lever is detached.

2. The vehicle seat according to claim 1,
   wherein the reclining lever includes: a frame part freely turnably connected to a rotation shaft of the reclining mechanism; and an operation part provided on a tip side of the frame part, and
   the frame part has a curved shape protruding downward, and is formed so as to have an up-to-down width which gradually decreases from the rotation shaft side toward the operation part side.

3. The vehicle seat according to claim 1, wherein the notch is provided at a position which is in the outer surface of the lift lever and corresponds to the reclining lever as turned upward.

4. The vehicle seat according to claim 1, wherein a held part which is fitted into and held by the rotation part of the seat part is formed on an inner surface of the turning base of the lift lever.

5. The vehicle seat according to claim 4, wherein
   the rotation part includes a circular body having an uneven outer periphery, and
   the held part includes a plurality of fit-in parts which are inserted into recesses of the outer periphery of the circular body.

6. The vehicle seat according to claim 5,
   wherein the fit-in parts are disposed in plurality on each of both sides of a center line passing through a center of the circular body and extending in a radial direction of the circular body, and
   a distance between the fit-in parts on one side of the center line and a distance between the fit-in parts on the other side of the center line differ from each other.

* * * * *